United States Patent

[11] 3,631,738

[72] Inventor Stephen James Harper
 Stoke, England
[21] Appl. No. 6,179
[22] Filed Jan. 27, 1970
[45] Patented Jan. 4, 1972
[73] Assignee Rootes Motors Limited
 London, England
[32] Priority Feb. 7, 1969
[33] Great Britain
[31] 6,821/69

[54] SLEEVE MOUNTING
 9 Claims, 9 Drawing Figs.
[52] U.S. Cl..................................................... 74/501 R,
 174/65 G, 85/5 R, 85/80, 248/27, 248/56,
 285/162, 285/DIG. 22, 287/20 R
[51] Int. Cl..................................................... F16c 1/10
[50] Field of Search........................................... 74/501 P,
 501; 287/20 R; 85/80, 81, 5; 174/153 G, 65 G;
 16/108; 285/162, DIG. 22; 248/56, 27 X

[56] References Cited
 UNITED STATES PATENTS

| | | | |
|---|---|---|---|
| 562,491 | 6/1896 | Schoup........................ | 85/5 R |
| 2,162,359 | 6/1939 | Rhinevault................... | 287/DIG. 9 |
| 2,405,400 | 8/1946 | Butterfield.................... | 85/5 R |
| 3,142,187 | 7/1964 | Kane............................. | 74/528 |
| 3,220,078 | 11/1965 | Preziosi........................ | 85/5 R |
| 3,366,405 | 1/1968 | Sevrence...................... | 74/501 X |
| 3,390,589 | 7/1968 | Tschanz........................ | 74/501 |
| 3,514,129 | 5/1970 | Holdren........................ | 285/162 |

*Primary Examiner*—William F. O'Dea
*Assistant Examiner*—P. D. Ferguson
*Attorney*—Mawhinney & Mawhinney ABSTRACT: A sleeve has a radially movable abutment resiliently mounted thereon for retaining the sleeve in an aperture by engaging one side of the wall adjacent the aperture. A release member projects from the abutment at a location adjacent the sleeve forwardly of the abutment to enable the abutment to be released from the wall from the other side thereof.

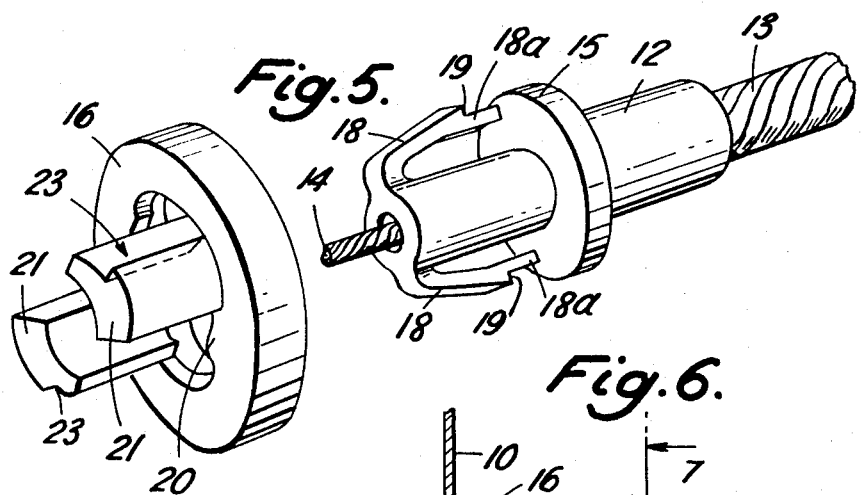
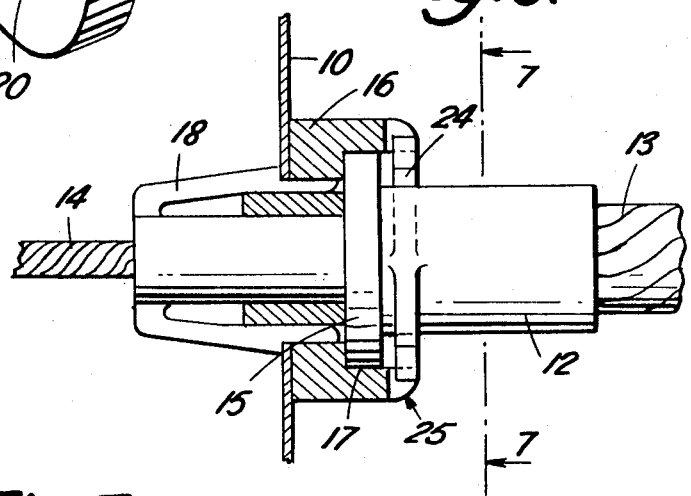
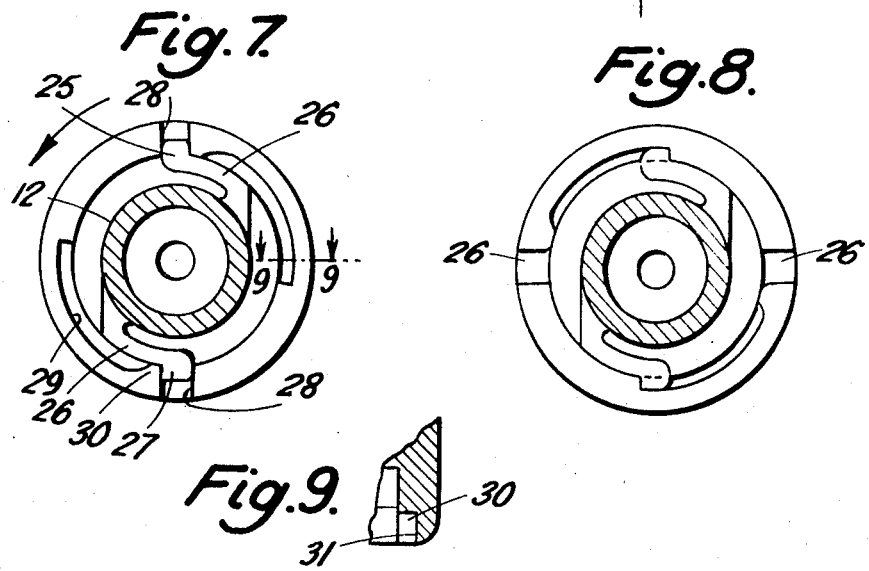
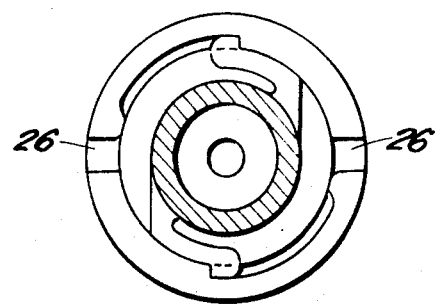
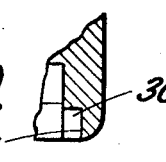

SLEEVE MOUNTING

The invention relates to a sleeve which is mountable in an aperture in a wall.

The invention provides a sleeve having a radially movable abutment mounted thereon for retaining the sleeve in an aperture in a wall by engagement with one side of the wall, characterized in that an abutment release member is provided which projects from the abutment at a location adjacent the sleeve forwardly of the abutment along the sleeve so as to be operable from the opposite side of the wall to the side which the abutment engages to release the abutment therefrom.

The abutment may have a resilient mounting on the sleeve which urges the abutment to a position for engaging one side of the wall.

The abutment may be formed on a resilient arm joined at one end to one end of the sleeve and extending axially along the sleeve, the abutments being formed part way along the arm on the side thereof remote from the sleeve and facing away from said one end and the part of the arm between the abutment and the other end of the arm forming said abutment release member.

Two abutments may be provided on the sleeve at diametrically opposed locations each having an abutment release member.

The abutment release member may engage a cam surface around the inner periphery of a ring which encircles and is rotatably mounted on the sleeve, the surface being shaped to displace the member towards the sleeve by rotation of the ring in one direction and to allow the member to move away from the sleeve by rotation of the ring in the opposite direction whereby the abutment can be disengaged and engaged with the wall.

The ring may be mounted on the sleeve against axial movement away from the abutment, the face of the ring adjacent the abutment providing an abutment surface which limits the extent to which the sleeve can be inserted into the aperture.

The ring may have a leg projecting axially from its inner periphery at a location away from the cam surface which leg projects towards the abutment member and is formed along an edge thereof adjacent the ring with a recess to accommodate the release member in one rotational position of the ring to prevent movement of the abutment release member towards the sleeve.

The ring and sleeve may have interengaging means for releasably holding the ring in one of two rotational positions in one of which the abutment member is engaged with the wall and in the other of which the abutment member is disengaged from the wall.

The interengaging means may comprise a detent mounted on the sleeve which in one of said rotational positions engages in a recess formed in the ring and in the other of the rotational positions engages a stop formed on the inner periphery of the ring.

Two detents may be provided at spaced locations on the sleeve each of which is engageable either with a recess or a stop on the ring.

In any of the arrangements referred to above the sleeve may be attached to or form an end part of a casing of a Bowden cable assembly.

The following is a description of one embodiment of the invention reference being made to the accompanying drawings in which:

FIG. 5 is an exploded perspective view of the sleeve and the part of the holding means;

FIG. 6 is a similar view to FIG. 1 showing a modified arrangement;

FIG. 7 is a section on the line 7—7 of FIG. 6 and with the sleeve locked to the panel;

FIG. 8 is a similar view to FIG. 7 but with the sleeve released from the panel; and FIG. 9 is a section in the line 9—9 of FIG. 7.

Figure 1:
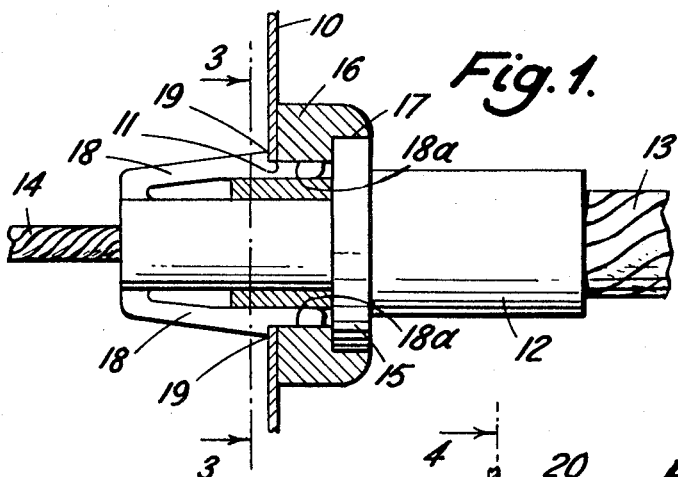
FIG. 1 is a part-sectional view of a sleeve mounted in an aperture in the panel.

Referring to FIG. 1 of the drawings there is shown a panel 10 having an opening 11 through which a sleeve 12 extends. The sleeve 12 is secured to one end of an outer casing 13 of a Bowden cable assembly having a cable 14 which extends through the outer casing 13 and through the sleeve 12.

A flange 15 is formed part way along the sleeve 12 and a ring 16 has an annular recess formed around one inner corner in which a peripheral part 17 of the flange 15 is received whereby the ring 16 is rotatably supported on the flange. The opposite end of the ring abuts the panel 10 around the opening 11.

Two axially extending resilient arms 18 are mounted at diametrically opposite locations on the end of the sleeve 12 remote from the outer casing 13. Each arm 18 extends along the sleeve towards the flange 15 and is formed with upstanding abutment faces 19 part way along its length which engages the panel 10 adjacent the opening 11 on the opposite side to the face on the ring 16. The resilience of the arms 18 is such that the arms 18 can be deflected inwardly towards the sleeve to permit the sleeve to be inserted into the opening 11 and when the abutment faces 19 clear the opening the resilience of the arms causes the arms to spring outwardly to bring the abutment faces into engagement with the panel adjacent the opening.

Figure 2:
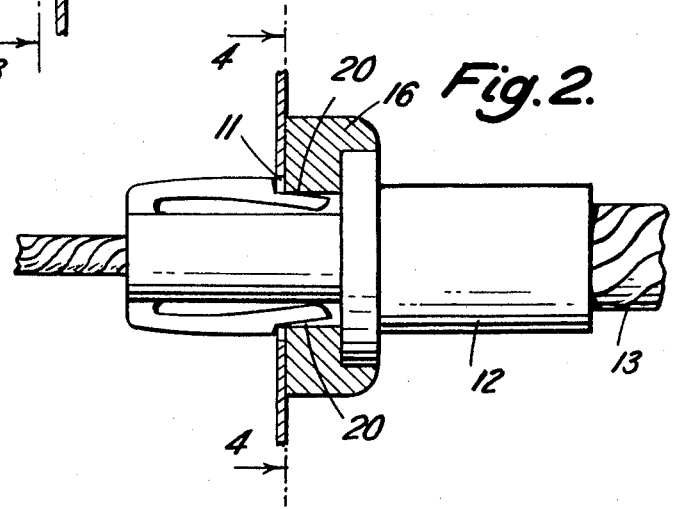
FIG. 2 is a view of the sleeve and panel shown in FIG. 1 with the holding means in a released condition.
Figure 3:
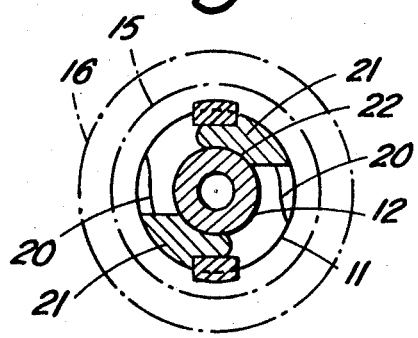
FIG. 3 is a sectional view on the line 3—3 of FIG. 1.
Figure 4:
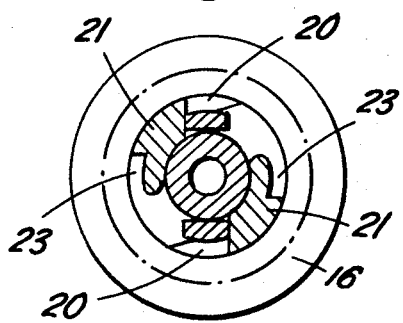
FIG. 4 is a sectional view on the line 4—4 of FIG. 2.

Limbs 18a of the arms 18 are encircled by the annular ring 16. As best seen in FIGS. 3 and 4 the ring 16 is formed at spaced locations around its inner periphery with two cam surfaces or ramps 20. By rotation of the annular ring 16 the parts 18a of the arms can be brought into engagement with the ramps 20 which by further rotation of the ring deflect the parts 18a inwardly towards the sleeve thereby releasing the abutment faces 19 from the side of the panel as shown in FIG. 2. The sleeve can then be withdrawn from the opening 11 in the panel.

The ring 16 is also formed with two axially extending legs 21 located at diametrically opposite positions on the ring. The inner surfaces of the legs are curved as indicated at 22 for engaging the outer surface of the sleeve 12. One outer corner of each leg 21 which is circumferentially spaced from a ramp 20 is recessed as indicated at 23 for receiving one of the parts 18a of a resilient arm by rotation of the annular ring 16 in a direction which moves the part 18a away from the ramp 20 on the ring. When located in the recess 23, as shown in FIG. 1 of the drawings, movement of the arm 18 towards the sleeve is prevented so that the sleeve can be locked in the aperture 11.

The sleeve 12 is secured in the aperture 11 in the panel 10 in the following manner. The end of the sleeve carrying the resilient arms 18 is introduced into the aperture 11 with the ring 16 rotated to the position indicated in FIG. 3 in which the arms 18 are held by the ramps 20 at their inner positions. The sleeve is inserted until the abutment face on the ring engages one side of the panel 10, to which position the abutment faces 19 on the arms 18 will have cleared the opening 11. The ring 16 is then rotated to release the arms from the ramps 20 so that the arms move outwardly to engage the abutment faces 19 with the other side of the panel to prevent withdrawal of the sleeve 12. The ring 16 is then rotated until the arms 18 are received in the recesses 23 in the legs 21 to prevent inward movement of the arms 18. To withdraw the sleeve 12 from the opening the reverse procedure is adopted.

It will be appreciated that this arrangement provides a sleeve which can be inserted in an opening in a panel from one side of the panel and subsequently not in the opening by actuation of the ring 16 from said one side of the panel and subsequently released by again actuating the ring 16 from said one side of the panel.

Referring now to the modified arrangement shown in FIGS. 6 to 9 of the drawings the ring 16 is axially longer and the recess 17 is deeper so that a part of the ring 16 indicated at 25 overhangs the right-hand end of the flange 15 as shown in FIG. 5. The part of the sleeve 12 within the part 25 of the ring is formed at diametrically spaced locations with resilient arms 26 each of which extends around a part of the inner periphery of the part 25 of the ring. Each arm 26 is formed at the end remote from the sleeve 12 with a head 27. The part 25 of the ring is formed at diametrically opposite locations with openings 28 in which the heads 27 on the arms 26 engage to oppose rotation of the ring 16 with respect to the sleeve. In this rotational position the arms 18 on the sleeve 12 are held in their outer positions as shown in FIG. 1. To one side of each of the openings 28 there is an arcuate groove 29 extending around part of the inner periphery of the part 25 of the ring. The end of the groove 29 and the adjacent edge of the opening 28 are formed to provide a smoothly curved ramp indicated at 30 between the groove 29 and opening 28. Thus when a sufficient torque is applied to the ring 16 in the direction of the arrow the heads 27 will ride up the ramps 30 allowing the ring 16 to rotate and will then drop into the groove 29. Eventually the heads 27 will come up against the ends of the grooves 29 remote from the openings to prevent further rotation of the ring 16. In this position of the ring 16 which is illustrated in FIG. 7 the arms 18 on the sleeve 12 are located at their inner positions as indicated in FIG. 2 of the drawings.

It will be appreciated that this arrangement will prevent excess transverse loads being applied to the arms 18.

To facilitate rotation of the ring 16 the outer periphery of the ring may be formed with axially extending shallow grooves to enable the ring to be readily gripped.

I claim:

1. A sleeve for mounting in an aperture in a wall the sleeve having,
   a. an abutment,
   b. resilient means to mount the abutment on the sleeve for movement radially of the sleeve,
   c. an abutment face on the abutment facing axially along the sleeve in one direction for engaging one side of the wall,
   d. a release arm connected to the abutment and extending axially along the sleeve from the abutment in said one direction to project through the aperture in the wall,
   e. a ring encircling the sleeve,
   f. means to mount the ring on the sleeve at a location spaced in said one direction from the abutment both for rotation around the sleeve and against axial movement along the sleeve away from the abutment,
   g. the release arm on the abutment engaging the inner periphery of the ring,
   h. cam means on the inner periphery of the ring to displace the arm and thereby the abutment radially inwardly to release the abutment face from the wall on rotation of the ring in one direction and to permit the arm and thereby the abutment to move radially outwardly under the action of said resilient means on rotation of the ring in the opposite direction, and
   i. an abutment face on the ring facing opposite the abutment face on the abutment and spaced therefrom by a distance corresponding to the thickness of the wall for engaging the opposite side of the wall.

2. A sleeve as claimed in claim 1 wherein the resilient means for mounting the abutment, the abutment and the release member are formed integrally with one another.

3. A sleeve as claimed in claim 2 wherein said resilient means comprises a resilient arm extending axially along the sleeve, the arm having one end which engages in said ring to provide said release arm and an opposite end joined to the sleeve and part way along a side of the arm remote from the sleeve a step is formed in the arm facing the ring to provide said abutment face.

4. A sleeve as claimed in claim 1 wherein a further abutment is provided diametrically opposite the first abutment on the sleeve, resilient means are provided to mount the further abutment on the sleeve for radial movement with respect to the sleeve, the further abutment has an abutment face facing the abutment face on the ring and a release arm is connected to the further abutment which arm extends axially along the sleeve and engages the inner periphery of the ring, and the ring has further cam means to displace the arm and thereby the further abutment radially inwardly on rotation of the ring in said one direction and to allow the arm and abutment to move outwardly on rotation of the ring in the opposite direction.

5. A sleeve as claimed in claim 1 wherein the ring has a leg projecting axially from its inner periphery at a location away from the cam means which leg projects towards the abutment member and is formed along an edge thereof adjacent the ring with a recess to accommodate the release arm in one rotational position of the ring to prevent movement of the release arm towards the sleeve.

6. A sleeve as claimed in claim 1 wherein the ring and sleeve have interengaging means for releasably holding the ring in one of two rotational positions in one of which the abutment is engaged with the wall and in the other of which the abutment is disengaged from the wall.

7. A sleeve as claimed in claim 6 wherein the interengaging means comprise a detent mounted on the sleeve which in one of said rotational positions engages in a recess formed in the ring and in the other of the rotational positions engages a stop formed on the inner periphery of the ring.

8. A sleeve as claimed in claim 7 wherein two detents are provided at spaced locations on the sleeve each of which is engageable either with a recess or a stop on the ring.

9. A sleeve as claimed in claim 1 wherein the sleeve is attached to or forms an end part of a casing of a Bowden cable assembly.

* * * * *